United States Patent [19]

Watanabe et al.

[11] 4,144,289
[45] Mar. 13, 1979

[54] VINYLIDENE CHLORIDE RESIN COMPOSITIONS CONTAINING CHLORINATED ETHYLENE/ACRYLATE OR METHACRYLATE COPOLYMER

[75] Inventors: Takeshi Watanabe; Kenichiro Kodama, both of Nobeoka, Japan

[73] Assignee: The Dow Chemical Company, Midland, Mich.

[21] Appl. No.: 916,668

[22] Filed: Jun. 19, 1978

[51] Int. Cl.$^2$ ............................................. C08L 27/08
[52] U.S. Cl. ................................................. 260/897 C
[58] Field of Search ........................................ 260/897

[56] References Cited

U.S. PATENT DOCUMENTS

| 3,076,781 | 2/1963 | Frey | 260/45.5 |
|---|---|---|---|
| 3,565,975 | 2/1971 | Goff et al. | 260/897 C |
| 3,856,891 | 12/1974 | West et al. | 260/897 C |

FOREIGN PATENT DOCUMENTS 42-16420  5/1967  Japan ........................................ 260/897

*Primary Examiner*—Carman J. Seccuro

[57] ABSTRACT

A vinylidene chloride resin composition which is particularly suitable for producing substantially transparent moldings having excellent gas barrier properties, such compositions comprising 100 parts by weight of a vinylidene chloride resin and 3 to 60 parts by weight of a chlorinated copolymer of from 50 to 95 parts by weight ethylene and from 5 to 50 parts by weight of an acrylic or methacrylic acid ester said copolymer having a chlorine content of from 5 to 50 percent by weight.

5 Claims, No Drawings

VINYLIDENE CHLORIDE RESIN COMPOSITIONS CONTAINING CHLORINATED ETHYLENE/ACRYLATE OR METHACRYLATE COPOLYMER

BACKGROUND

The present invention relates to vinylidene chloride resin compositions which are particularly suitable for producing substantially transparent moldings having improved gas barrier properties.

Over many years, moldings of vinylidene chloride resins have been used for producing packaging films for foods and the like products due to their transparency and to their excellent barrier resistance to gas such as oxygen and to water vapor.

In the industrial production of such vinylidene chloride resin moldings, plasticizers are generally added to the resin in order to lower its softening point and facilitate its processing as well as to inhibit heat deterioration occurring during the processing and impart to the moldings desirable properties such as flexibility and toughness.

However, the use of such additives, which generally exist as a liquid at temperatures where the moldings are used or kept in storage, tends to deteriorate the gas barrier properties of the vinylidene chloride resin moldings. Therefore, although the quantity of plasticizers, and other additives added to the resin, is generally restricted to the lowest level to meet the desired purpose, it cannot be concluded that the vinylidene chloride resin moldings which are now commercially available in the market are fully exhibiting their advantageous features due to reduction in the gas barrier properties derived from the use of such plasticizers.

To offset the shortcoming mentioned above, it has been proposed to add a rubber-like material such as a butadiene copolymer or ethylene-vinyl acetate copolymer to the vinylidene chloride resin in place of the plasticizer or a part thereof. However, if such a rubber-like material is to be used as a substitute for the plasticizer or to make up for the decrease in the quantity of the plasticizer, a relatively large quantity is required to be added because of its poor stabilizing ability. Further, since the compatibility of these rubber-like materials with the vinylidene chloride resins is far inferior to that of plasticizers, the transparency of the resultant moldings is lost if such rubber-like materials are added in a large quantity. Thus, so far as the conventional rubber-like materials are used, it has been difficult to obtain moldings which are satisfactory with regard to both transparency and gas barrier properties.

It is, therefore, an object of the present invention to further improve the gas barrier properties of such vinylidene chloride resin moldings without sacrificing the transparency thereof.

SUMMARY

The above and related objects are accomplished utilizing a molding grade vinylidene chloride resin composition comprising (a) 100 parts by weight of a vinylidene chloride resin obtained by polymerizing from 60 to 95 parts by weight of monomeric vinylidene chloride and from 40 to 5 parts by weight of an ethylenically unsaturated comonomer and (b) from 3 to 60 parts by weight of a chlorinated copolymer of from 50 to 95 parts by weight ethylene and from 5 to 50 parts by weight of an acrylic or methacrylic acid ester containing from 1 to 18 carbon atoms in the ester group, said copolymer having a chlorine content of from 5 to 50 percent by weight.

DETAILED DESCRIPTION

The vinylidene chloride resins referred to in the present invention are those copolymers which are obtained by polymerizing 60–95 parts by weight of monomeric vinylidene chloride and 40–5 parts by weight of an ethylenically unsaturated comonomer, by any well-known process.

The comonomers referred to herein include, for example: vinyl chloride; acrylic (or methacrylic) esters such as methyl acrylate (or methacrylate), ethyl acrylate (or methacrylate), butyl acrylate (or methacrylate), lauryl methacrylate, stearyl methacrylate, 2-ethylhexyl acrylate; unsaturated carboxylic acids such as acrylic (or methacrylic) acid, itaconic acid, maleic acid, monomethyl maleate, monobutyl maleate; vinyl esters such as vinyl acetate, vinyl propionate; acrylamide (or methacrylamide); and acrylonitrile (or methacrylonitrile). Two or more of said comonomers may be used in combination, if required.

Further, the method of polymerization used for the vinylidene chloride resins useful in the present invention may be any well-known process generally used for polymerizing vinylidene chloride monomer, including conventional suspension, emulsion or solution polymerization techniques wherein the monomeric materials are added stepwise or continuously during the course of polymerization.

The ethylene-acrylic acid (or methacrylic acid) ester copolymers referred to in the present invention are copolymers of ethylene and one or more polymerizable monomers selected out of the group comprising acrylic (or methacrylic) esters such as methyl acrylate (or methacrylate), ethyl acrylate (or methacrylate), butyl acrylate (or methacrylate), lauryl methacrylate, stearyl methacrylate and 2-ethylhexyl acrylate.

The melting viscosity of such copolymers and their compatibility with the vinylidene chloride resin vary with the acrylic (or methacrylic) ester content of the ethylene-acrylic (or methacrylic) acid ester copolymer. The ethylene-acrylic (or methacrylic) acid ester copolymer used according to the present invention may be any of those copolymers which contain 5–50 percent by weight of acrylic (or methacrylic) ester. Those ethylene-acrylic (or methacrylic) ester copolymers which have an acrylic (or methacrylic) ester content exceeding 50 percent by weight are hard to handle due to their excessive tackiness. Increasing the molecular weight to overcome such a difficulty not only will result in the loss of melt fluidity and the decreased plasticizing ability when subjected to molding, but also is disadvantageous from the viewpoint of cost. While, if an ethylene-acrylic (or methacrylic) ester copolymer containing less than 5 percent by weight of acrylic (or methacrylic) ester is used, the degree of chlorination must be significantly increased in order to improve its compatibility with the vinylidene chloride resin. This will result also in the loss of melt fluidity and the copolymer will become incompatible with the vinylidene chloride resin.

According to the present invention, a suitable chlorine content in the chlorinated ethylene-acrylic (or methacrylic) acid ester copolymer is in the range of 5–50 percent by weight. Those chlorinated copolymers which contain more than 50 percent by weight of chlorine not only exhibit an increased rigidity and inferior melt fluidity resulting in reduced plasticizing ability, but also are susceptible to thermal decomposition. Further, when molding a vinylidene chloride resin mixed with such a high-chlorine content chlorinated ethylene-acrylic (or methacrylic) ester copolymer, a substantial quantity of plasticizer must be added in combination therewith to facilitate the molding operation. Still further, those chlorinated ethylene-acrylic (or methacrylic) ester copolymers containing less than 5 percent by weight of chlorine, lack sufficient compatibility with the vinylidene chlorine resins and are incapable of producing transparent moldings.

Mixing with the vinylidene chloride resin two or more different chlorinated ethylene-acrylic (methacrylic) acid ester copolymers, such as those having varied types and/or contents of acrylic (or methacrylic) acids or those having varied chlorine contents, and processing the resultant mixture to obtain moldings also constitutes a part of the present invention.

According to the present invention, a suitable ratio of the chlorinated ethylene-acrylic (methacrylic) acid ester copolymer to be mixed with the vinylidene chloride resin is in the range of 3–60 parts by weight per 100 parts by weight of vinylidene chloride resin.

The addition of the chlorinated ethylene-acrylic (methacrylic) acid ester copolymer exceeding 60 parts by weight will result in undesirable reduction in the tensile strength of the resultant moldings and give rise to a problem, especially, when such moldings are handled at higher temperatures. If the added quantity of the chlorinated ethylene-acrylic (or methacrylic) acid esters is less than 3 parts by weight, it is necessary to add a substantial quantity of a plasticizer in combination therewith from the viewpoint of the moldability and the quality of resultant moldings. The gas barrier properties of the resultant moldings then become almost the same as those attainable in the prior art methods and the desirable features of the present invention are lost.

To mix the chlorinated ethylene-acrylic (or methacrylic) acid ester copolymer with the vinylidene chloride resin, the chlorinated ethylene-acrylic (or methacrylic) acid ester copolymer may be mechanically mixed as pellet or powder with the vinylidene chloride resin or the solution of the chlorinated ethylene-acrylic (or methacrylic) acid ester copolymer may be added to the latter with the subsequent removal of the solvent. Alternatively, a process may be used, in which the chlorinated ethylene-acrylic (or methacrylic) acid ester copolymer is first dissolved in the vinylidene chloride resin monomer and the resultant mixture subjected to polymerization in such a manner that the vinylidene chloride resin and the chlorinated ethylene-acrylic (or methacrylic) acid ester copolymer are consequently dispersed evenly and uniformly in each other.

Further, according to the present invention, plasticizers, heat stabilizers, antioxidants, light stabilizers, lubricants and other additives may be used in combination as additives for the vinylidene chloride resin compositions of the present invention. However, in view of the primary object of the invention to obtain moldings from a composition having excellent gas barrier properties, the total quantity of such additives should be kept under 10 parts by weight per 100 parts by weight of vinylidene chloride resin and 3–60 parts by weight of chlorinated ethylene-acrylic (or methacrylic) acid ester copolymers.

Hereinafter, the features and substance of the present invention will be described further in detail by way of the preferred embodiments thereof. Through all preferred embodiments and comparative examples which follow, parts and percent are given in terms of parts and percent by weight, respectively.

PREFERRED EMBODIMENT NO. 1

One hundred (100) kg of a 0.05 percent aqueous solution of hydroxypropyl methylcellulose, 50 g of sodium pyrophosphate, and 350 g of a uniform solution of 20 parts of diisopropyl peroxydicarbonate and 80 parts of acetyl tributyl citrate were charged to a polymerization reactor having an interior glass lining and an agitator. Then oxygen in the reactor was evacuated by being substituted by nitrogen and, further, a vacuum was drawn therefrom. Separately, 54.6 kg of vinylidene chloride and 15.4 kg of vinyl chloride were weighed and mixed in a weighing vessel, and the resultant monomer mixture was transferred into the reactor while its contents were being stirred and a suspension was produced therein. The suspension was then first subjected to polymerization reaction for 35 hours at 36° C. and, immediately thereafter, for 19 hours at 49° C.

The weight of the produced copolymer was 59.2 kg after being dried. In the description of the preferred embodiments and comparative examples which follow, the thus produced vinylidene chloride-vinyl chloride copolymer shall be referred to as Copolymer A.

Thereafter, 100 g of a copolymer of ethylene and methyl methacrylate (containing 15 percent of methyl methacrylate and having a melt index of 60 g/10 minutes) and 1,000 ml of carbon tetrachloride were placed in a separable type four-port glass flask of 2 l capacity provided with an agitator and a cooling pipe, and heated to 75° C. to be uniformly dissolved. After the temperature reached 75° C., chlorine gas was continuously blown into the solution, and the solution was subjected to reaction for 14 hours at that temperature. Then the heating and the chlorine gas blow were stopped, and nitrogen gas was blown therein to expel the residual chlorine gas dissolved therein.

Analysis showed that the chlorinated ethylene and methyl methacrylate copolymer contained 26.3 percent of chlorine following removal of the solvent.

One hundred (100) g of the chlorinated substance produced through the aforementioned reaction was dissolved in chloroform, and the resultant solution was mixed with 1 kg of said Copolymer A. Thereafter, chloroform was removed by evaporation, and the remaining composition was extruded in a well-known manner through a screw-type extruder with diameter of 1.5 inch and L/D = 12 to produce an inflated film.

PREFERRED EMBODIMENT NO. 2

One hundred (100) g of an ethylene-methyl methacrylate copolymer (containing 18 percent of methyl methacrylate and having a melt index of 95 g/10 minutes) and 1,000 ml of carbon tetrachloride were placed in a flask identical to that used in the Preferred Embodiment No. 1 and caused to react for 28 hours at 75° C. while blowing chlorine gas therein. Consequently, a chlorinated ethylene-methyl methacrylate copolymer having a chlorine content of 39.7 percent was obtained.

Then, in the same manner as the Preferred Embodiment No. 1 100 g of thus produced chlorinated substance was mixed with 1 kg of Copolymer A also to obtain an inflated film.

COMPARATIVE EXAMPLE NO. 1

100 Grams of an ethylene-methyl methacrylate copolymer (containing 15 percent of methyl methacrylate and having a melt index of 60 g/10 minute) identical to that used in the Preferred Embodiment No. 1 was dissolved in chloroform, and the resultant solution was mixed with 1 kg of Copolymer A. After removing chloroform, an inflated film was obtained in a similar manner to the Preferred Embodiment No. 1.

COMPARATIVE EXAMPLE NO. 2

100 Grams of an ethylene-methyl methacrylate copolymer (containing 18 percent of methyl methacrylate and having a melt index of 95 g/10 minutes) identical to that used in the Preferred Embodiment No. 2 was dissolved in chloroform, and the resultant solution was mixed with 1 kg of Copolymer A. After removing chloroform, an inflated film was obtained in a similar manner to the Preferred Embodiment No. 1.

COMPARATIVE EXAMPLE NO. 3

Acetyl tributyl citrate, dibutyl sebacate and epoxidized soybean oil were added to a part of the Copolymer A as plasticizers consequently to obtain a composition containing 3.0 percent of acetyl tributyl citrate, 3.5 percent of dibutyl sebacate and 1.7 percent of epoxidized soybean oil, respectively. Said resultant composition was extruded into a biaxially oriented inflated film in the same way as the Preferred Embodiment No. 1.

Those inflated films obtained in the aforementioned Preferred Embodiment Nos. 1 and 2 and the Comparative Example Nos. 1 through 3 were evaluated for their external appearances (hue and transparency) and the oxygen permeability was measured on the inflated films except for those obtained in the Comparative Example Nos. 1 and 2. The results of these evaluations and measurement are shown in the following Table 1. The inflated films obtained in the Comparative Example Nos. 1 and 2 were unsuitable to have the oxygen permeabilities thereof measured because they were not capable of being uniformly inflated.

As clearly seen when comparing the Preferred Embodiment No. 1 with the Comparative Example No. 1 and the Preferred Embodiment No. 2 with the Comparative Example No. 2, respectively, the ethylene-methyl methacrylate copolymer as added without being chlorinated lacks in necessary compatibility with the vinylidene chloride-vinyl chloride resin (Copolymer A) and the inflated film obtained from the mixture thereof exhibits a substantially opaque and milky white appearance. Further, the film obtained from the mixture of the chlorinated ethylene-methyl methacrylate copolymer and the vinylidene chloride-vinyl chloride resin exhibits hue and transparency almost identical to that of conventional films obtained from vinylidene chloride resin compositions as described in the Comparative Example No. 3. Further, the inflated films obtained in the Preferred Embodiment Nos. 1 and 2 having an oxygen permeability approximately one-tenth of that of the films obtained from the prior art compositions as shown in the Comparative Example No. 3. Thus, it has been proven that the present invention can provide moldings having excellent transparency and greatly improved gas barrier properties.

As clearly illustrated from the foregoing description of the preferred embodiments and comparative examples, those moldings which are obtained from vinylidene chloride resin compositions according to the present invention exhibit almost the same transparency as that of those moldings obtained from conventional vinylidene chloride resin compositions and are far superior to the latter moldings in respect of the gas barrier properties. Accordingly, it can be concluded that the compositions according to the present invention are highly useful as materials of films and containers for wrapping or packaging goods such as foods which are easily deteriorated by the permeation of oxygen and other gases.

Table 1

| | Chlorine *1) Content % | External Appearance Hue | Transparency | Oxygen *2) Permeability ($\frac{CC \cdot cm}{cm^2 \cdot sec. \cdot cmHg}$) |
|---|---|---|---|---|
| Preferred Embodiment No. 1 | 26.8 | Slightly brown | Almost transparent | $2.4 \times 10^{-13}$ |
| Preferred Embodiment No. 2 | 39.7 | Slightly brown | Transparent | $1.2 \times 10^{-13}$ |
| Comparative Example No. 1 | — | Milky white | Opaque | — |
| Comparative Example No. 2 | — | Milky white | Opaque | — |
| Comparative Example No. 3 | — | Milky white | Transparent | $28.3 \times 10^{-13}$ |

Note:
*1 Chlorine content of chlorinated ethylene-methyl methacrylate copolymer measured by Schoninger's oxygen flask method.
*2 Measured at 20° C by means of OXTRAN 100 Oxygen Permeability Measuring Unit.

What is claimed is:

1. A molding grade vinylidene chloride resin composition comprising (a) 100 parts by weight of a vinylidene chloride resin obtained by polymerizing from 60 to 95 parts by weight of monomeric vinylidene chloride and from 40 to 5 parts by weight of an ethylenically unsaturated comonomer and (b) from 3 to 60 parts by weight of a chlorinated copolymer of from 50 to 95 parts by weight ethylene and from 5 to 50 parts by weight of an acrylic or methacrylic acid ester containing from 1 to 18 carbon atoms in the ester group, said copolymer having a chlorine content of from 5 to 50 percent by weight.

2. The composition of claim 1 wherein said chlorinated copolymer is a chlorinated copolymer of ethylene and methyl methacrylate.

3. The composition of claim 2 wherein said chlorinated copolymer of ethylene and methyl methacrylate contains from 15 to 18 percent by weight of methyl methacrylate and from about 26 percent to about 40 percent by weight of chlorine.

4. The composition of claim 3 wherein said chlorinated copolymer of ethylene and methyl methacrylate is present in an amount of about 10 percent by weight based on the weight of said vinylidene chloride resin.

5. The composition of claim 1 wherein said vinylidene chloride resin is obtained by polymerizing from about 78 percent by weight vinylidene chloride with from about 22 percent by weight vinyl chloride.

* * * * *

UNITED STATES PATENT AND TRADEMARK OFFICE
CERTIFICATE OF CORRECTION

PATENT NO. : 4,144,289

DATED : March 13, 1979

INVENTOR(S) : Takeshi Watanabe and Kenichiro Kodama

It is certified that error appears in the above–identified patent and that said Letters Patent are hereby corrected as shown below:

In the assignment data, the assignee's name and address should be changed from "The Dow Chemical Company, Midland, Mich." to -- Asahi-Dow Limited, Tokyo, Japan --.

Signed and Sealed this

Seventeenth Day of July 1979

[SEAL]

*Attest:*

LUTRELLE F. PARKER

*Attesting Officer*    *Acting Commissioner of Patents and Trademarks*